UNITED STATES PATENT OFFICE.

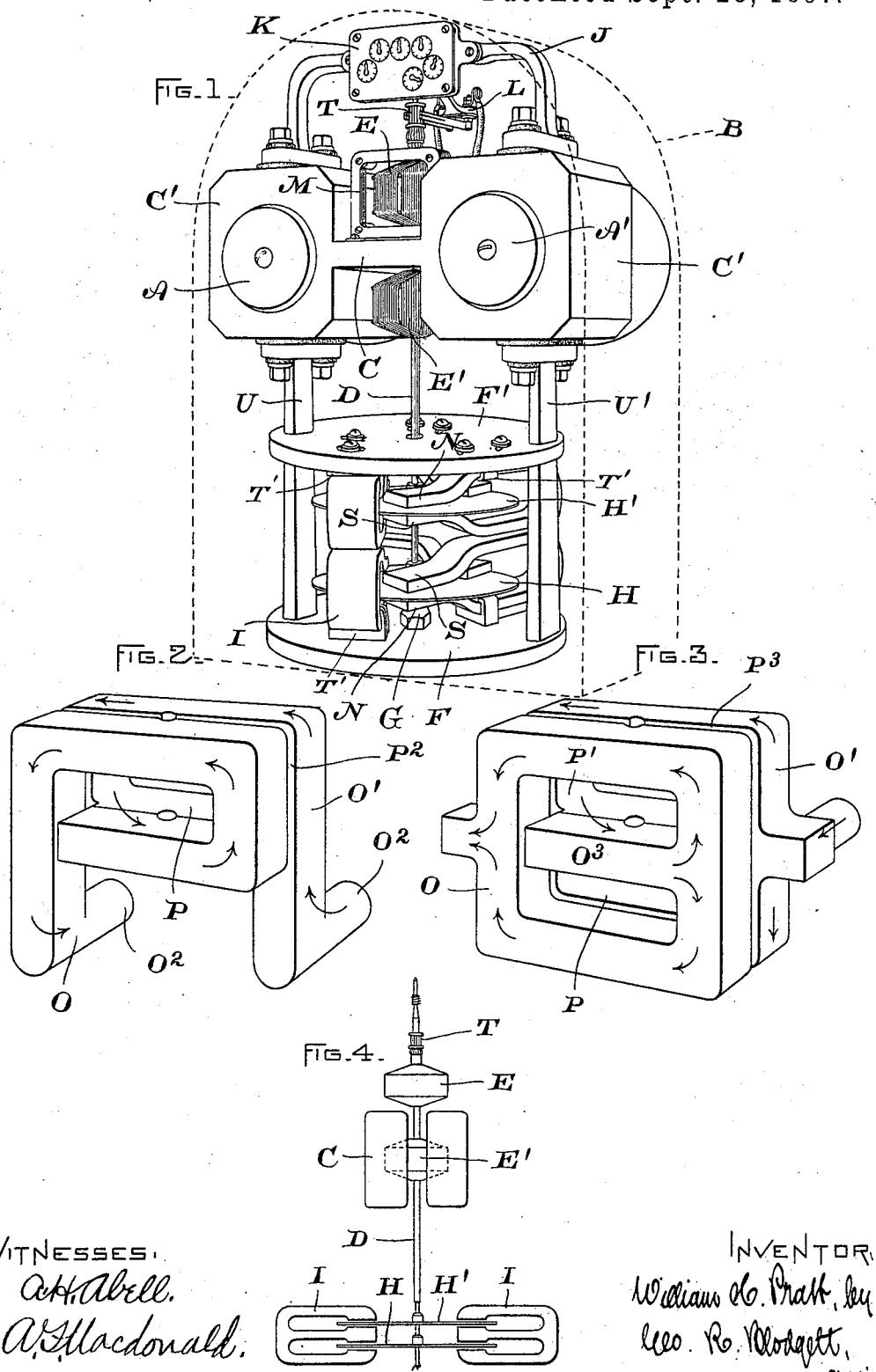

WILLIAM H. PRATT, OF LYNN, MASSACHUSETTS, ASSIGNOR TO THE GENERAL ELECTRIC COMPANY, OF NEW YORK.

RECORDING-WATTMETER.

SPECIFICATION forming part of Letters Patent No. 590,648, dated September 28, 1897.

Application filed May 15, 1897. Serial No. 636,653. (No model.)

*To all whom it may concern:*

Be it known that I, WILLIAM H. PRATT, a citizen of the United States, residing at Lynn, in the county of Essex, State of Massachusetts, have invented certain new and useful Improvements in Recording - Wattmeters, (Case No. 559,) of which the following is a specification.

The present invention relates to electric meters employed in measuring the electric energy which is consumed by translating devices, and has for its object to provide a recording-meter which is astatic, so that the readings obtained therefrom are unmodified by magnetic fields external to the meter—for example, fields induced by magnets or by currents traversing electric conductors in proximity to the meter.

I have found that in employing standard types of wattmeters for recording the electric output of a large generator or of a station the magnetic field induced by heavy currents passing to and from the meters or in proximity thereto is sufficient to affect the meter and render its registration inaccurate. In some instances the magnetic field induced by the conductors is in a direction to accelerate the speed of the meter-armature and in other instances to retard it. It may also act upon the rotating disk and serve as an additional damping device or it may weaken the damping-magnets and permit the speed of the meter-armature to increase. Such increases are especially liable to occur in central-station meters, where bus-bars and other conductors carrying heavy currents are arranged on the switchboards in proximity to the meter. To overcome this objection, I divide both motor and damping mechanisms into two or more parts and so arrange the parts that stray magnetic lines which tend to strengthen one part of the motor or damping mechanism will decrease the strength of the remaining part or parts, so that the effect of the stray field on the meter is neutralized and can be disregarded. While I propose using a meter in which both the motor and damping mechanisms are rendered astatic by being divided into two parts arranged as described as the most perfect form of the invention, yet I do not limit all of my claims to such a construction, but desire to cover also a meter in which the motor mechanism alone is so treated or even the damping mechanism alone.

In the accompanying drawings, attached to and made a part of this specification, Figure 1 is a perspective view of a meter embodying my invention. Figs. 2 and 3 are modified forms of the field-magnet construction, and Fig. 4 is a modification of the damping device.

I have shown my invention applied to a station-wattmeter of the Thomson type, which is designed to measure very heavy currents. At A and A' are indicated terminals which extend through the back of the meter-casing B, (shown in dotted lines,) and are connected in series with the circuit to be measured. The field-magnet consists of a double-U-shaped copper conductor C, provided with enlarged ends C', which surround the terminals A A' and are electrically connected thereto. The field-magnet has only a single turn, but as it is intended for very heavy currents the magnetization is sufficient to cause the armature of the meter to rotate when current flows therein. I do not, however, limit myself to recording-meters for circuits carrying heavy currents, for my invention is applicable to meters for all kinds of service.

Mounted upon the shaft D is an armature divided into two parts E and E'. These are located, respectively, above and below the field-magnet conductor C. The armature is connected in shunt to the mains which supply current to the translating devices. The two armature-sections, as shown in Fig. 1, are connected in a circuit leading from a single commutator T. Instead of a single armature divided into two parts and arranged as described two separate armatures having individual commutators may be employed, though the former construction is preferred. In either case the windings are so arranged that they both tend to propel the armature-shaft in the same direction. The magnetic flux due to the conductor C affects both parts of the armature-winding equally, but in opposite directions, since one section is situated above and the other below the commutator C'. The direction of winding in the two sections is such that both act cumulatively.

It will be seen that any stray magnetic field tending to increase or retard the speed of the upper part E of the armature will have an opposite effect upon the lower part E', since the stray field and normal motor-field will act cumulatively upon one armature-section, but differentially upon the other. The armature-sections being located so close together, the effect of a stray field is approximately equal on both and any effect upon one is counteracted by the other.

Bolted to the upper side of the enlarged ends C' of conductor C and insulated therefrom is a U-shaped frame J, which carries the dial K and also supports the bearing (not shown) for the upper end of the armature-shaft. Extending rearwardly from the frame J is a bracket L, which supports the commutator-brushes.

To produce a starting or initial torque to overcome friction, auxiliary shunt field-coils M are employed, which surround the upper part E of the armature on two sides. These are in series with the armature and in shunt to the supply-mains.

Bolted to the under sides of the enlarged ends of conductor C and insulated therefrom are downwardly-extending frame-pieces U U', which support the main and auxiliary bases F and F'. The armature-shaft D is mounted at its lower end in a jewel-bearing G, which is carried by the main base F. Two copper damping-disks H and H' are rigidly secured to the armature-shaft and rotate between the field-poles of permanent magnets I. The magnets acting upon their respective disks are arranged in pairs, with their like poles adjacent, as indicated by N S S N. Half of the magnets are carried by the main base F and the remainder by the auxiliary base F'. The magnets are mounted in adjustable clamps T', which are so arranged that they may be moved toward or away from the armature-shaft to adjust the damping effect of the magnets. Any stray magnetism will, on account of the nearness of the pairs of magnets, affect both of them equally, but in such manner that where it strengthens one of a pair it weakens its mate, so that the total effect of the damping is not changed.

The surrounding case B may be made of iron and act as a magnetic shield.

In Fig. 2 is shown a modification of the field-coil, consisting of right and left hand copper castings O and O', each casting forming a single turn. The upper and side portions of the castings are insulated from each other by an air-space $P^2$, but the lower horizontal portions are somewhat thicker and are in electrical contact. When assembled, an opening P is formed, in which one element of the armature rotates. The other element or armature may be above or below, as desired. Extending rearwardly from each casting are lugs $O^2$, forming terminals for the meter. The arrows show the direction of current flowing in the coil.

Fig. 3 is a modification of the field-coil differing from the one shown in Fig. 2 in that the field-conductor is arranged to surround both armatures. The coil consists of counterpart castings O and O', rectangular in form and provided with central pieces $O^3$. These pieces are connected to the castings at one end and are free at the other. The castings are separated from each other by an air-space $P^3$, with the exception of the pieces $O^3$, which are in contact and form the electrical connection between the castings. In this case the parts of an armature or armatures are mounted in the openings P and P'. The arrows indicate the direction of current flowing through the coil.

In Fig. 4 is shown a modification of the damping device, in which disks H and H', of conducting material, are rigidly mounted upon the armature-shaft D and revolve within the field of magnets I. The magnets have three extensions, one between the disks and the other two outside. The polarity of the middle extension is so arranged that it is opposite to that of the outside ones.

The armature is divided into two parts E and E' and is provided with a single commutator T. One part of the armature revolves within field-coils C and the other part is located above the coils and is to a certain degree affected by them.

Since the armatures are affected by the field coil or coils to produce rotation in one direction, while external or stray magnetism retards one armature, but assists the other, it follows that one armature may revolve in a stronger field than the other without detriment to the compensation, provided that the armature-windings are so adjusted that the stray field will tend to speed one armature and retard the second by corresponding amounts. It is, however, preferable to have both armatures revolving in fields which are substantially equal in strength.

In all the arrangements herein set forth the different armatures or armature-sections cut the magnetic lines of the field-magnet in opposite directions, but coact to produce torque on the meter-shaft in the same direction. Hence of course any external field which may act upon both armature-sections in the same direction will tend to create additional torques upon the armature-shaft in opposite directions, and such torques will be self-compensating in so far as their influence upon the speed of the meter is concerned. Hence the meter will be astatic as against the influence of all stray fields which act upon the different parts of the motor mechanism in the same direction, and this will be found sufficient for practical purposes. Furthermore, while the induction influence of stray fields may not be precisely the same upon both armature-sections, yet the different sections will usually be quite close together, and the inductive distance from the source of stray fields sufficiently the same to answer all practical purposes.

What I claim as new, and desire to secure by Letters Patent of the United States, is—

1. In a recording-meter, the combination of an astatic motor mechanism, comprising more than a single armature-winding, or section of winding which respectively act under the influence of magnetism in opposite directions to rotate the shaft in the same direction, and a damping mechanism.

2. In a recording-meter, a motor mechanism having more than a single winding, or section of winding, arranged so that the influence of any external magnetism acting upon said armature-sections in the same direction will tend to create a torque in opposite directions, thereby rendering the meter astatic, as described.

3. In a recording electric meter, the combination of a motor mechanism, a recording mechanism, and an astatic magnetic damping mechanism having parts which are acted upon differentially by stray or external fields, so as to preserve a constant magnetic drag substantially uninfluenced by stray fields, as described.

4. In an electric recording-meter, the combination of an astatic motor mechanism affording a torque proportional to the energy metered uninfluenced by stray fields, and an astatic magnetic damping mechanism affording a drag constantly proportional to the velocity, as set forth.

5. In an electric recording-wattmeter, the combination of a double-U-shaped field-exciting conductor, and an armature wound with two sections located respectively in or near the bends of the field-conductor, said armature-sections having a single commutator, as set forth.

6. In a recording-wattmeter, the combination of a field-magnet circuit, an armature divided into two parts and forming an astatic motor mechanism for driving the meter, and an astatic damping device consisting of a pair of disks made of conducting material, each disk moving in a separate magnetic field.

7. In a recording-wattmeter, the combination of a field-magnet circuit, with an armature divided into two parts, the parts being so arranged that both are acted upon by the field magnetism to produce rotation in one direction, but are acted upon differentially by any external magnetism.

8. In a recording-wattmeter, the combination of a field-magnet conductor, an armature divided into two parts, one part being located above the conductor and the other below, the coils on both parts being so arranged that they are influenced by the field to produce rotation in the same direction, and a recording mechanism.

9. In a recording-wattmeter, the combination of a field-coil, an armature divided into two parts, each part being acted upon by a magnetic flux differing in its direction, each part of the armature being so arranged that both tend to rotate in the same direction under the inductive action of the field-coil, but are acted upon differentially by any external magnetism.

10. In a recording-wattmeter, the combination of a field-coil, a rotating armature divided into two parts and so arranged that both parts tend to revolve in the same direction under the influence of the field-magnet, but act differentially under the influence of external or stray magnetism, and a damping device comprising two disks of conducting material revolving in a magnetic field, the arrangement of disks and magnets being such that they act differentially under the influence of external magnetism.

11. In a recording-wattmeter, the combination of a field-coil, an armature, and a damping device consisting of two disks of conducting material moving within a magnetic field, the arrangement of disks and magnets being such that external magnetism will weaken one of the magnets and consequently the effect upon its disk, and strengthen another of the magnets and increase the effect upon its disk, thus balancing the total damping effect.

12. In a recording-wattmeter, the combination of a field-conductor, an armature divided into two parts and situated respectively above and below the conductor and partially surrounded by it, a single commutator for the armature, a base supported by depending pieces from the field-conductor, an auxiliary base, a set of magnets supported by each base, and copper disks secured to the armature-shaft and revolving in the magnetic fields.

13. In a recording-wattmeter, the combination of a field-coil, a main and auxiliary base, magnets supported by the bases, and arranged with their like poles adjacent, clamps in which the magnets are adjustable, and copper disks revolving in the magnetic fields.

In witness whereof I have hereunto set my hand this 6th day of May, 1897.

WILLIAM H. PRATT.

Witnesses:
JOHN W. GIBBONEY,
HENRY O. WESTENDARP.